Feb. 16, 1937.   W. BLATT   2,071,107
DISK BRAKE
Filed March 4, 1935   2 Sheets-Sheet 1
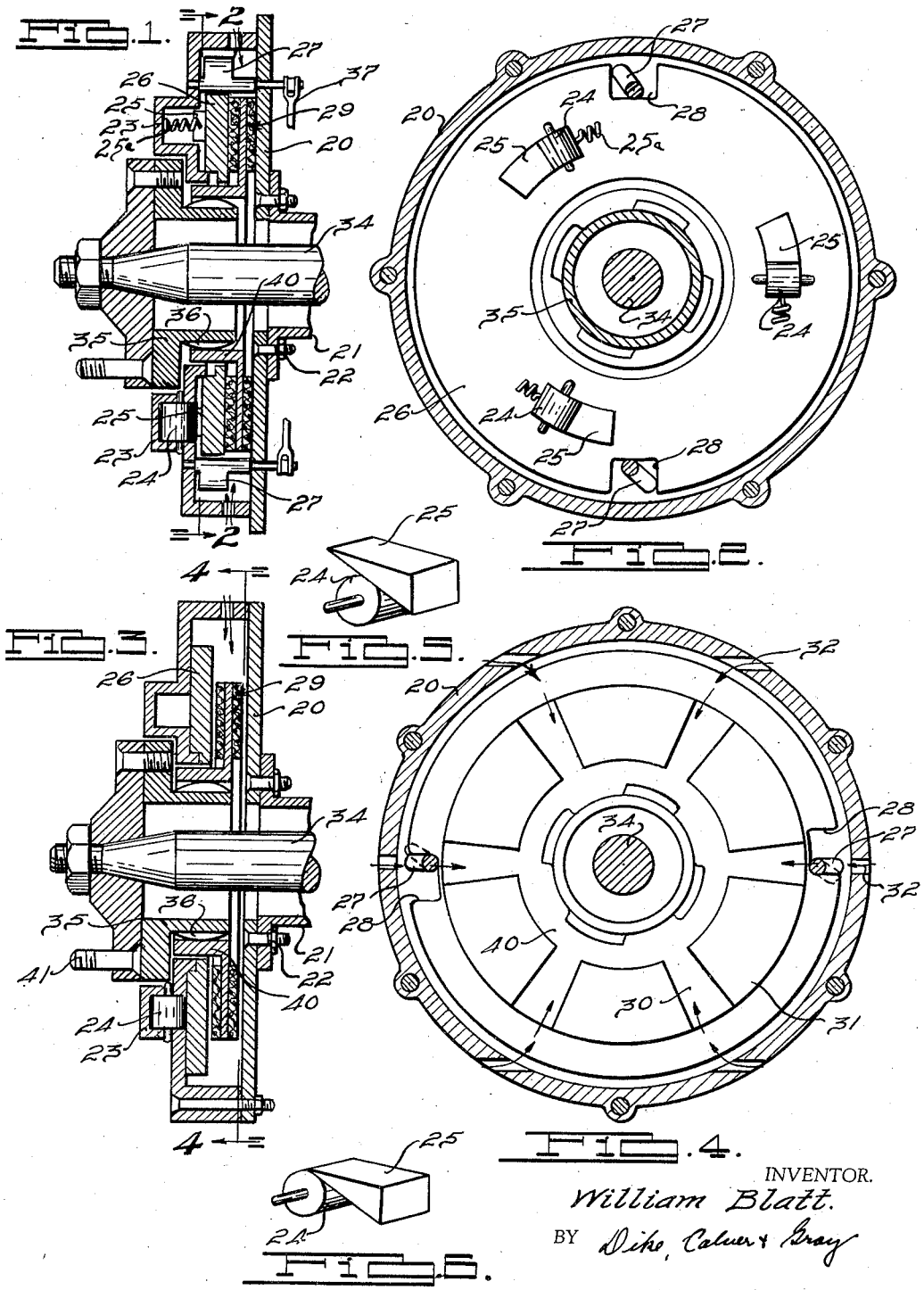
INVENTOR.
William Blatt.
BY Dike, Calver & Gray
ATTORNEYS.

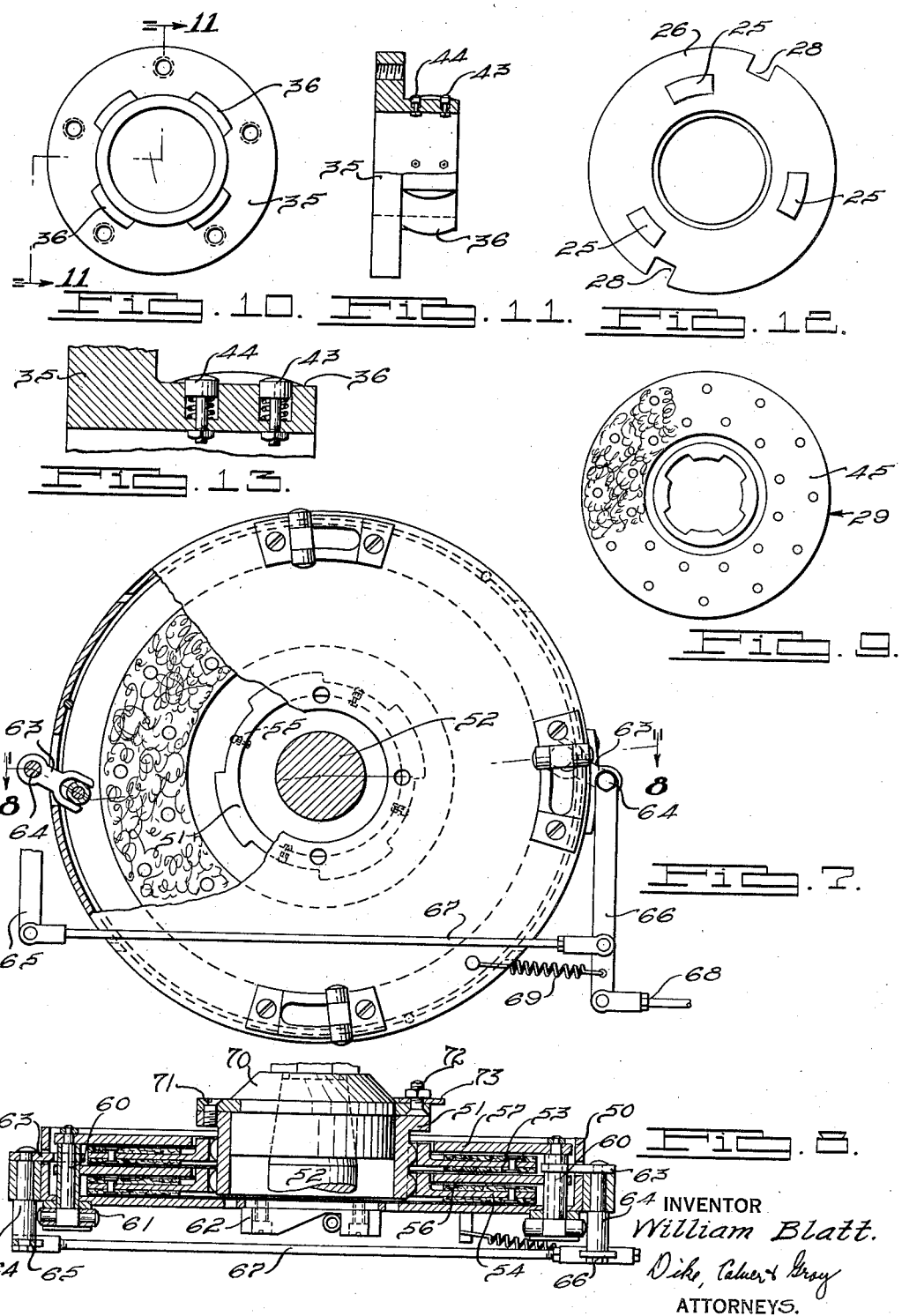

Patented Feb. 16, 1937

2,071,107

UNITED STATES PATENT OFFICE 2,071,107

DISK BRAKE

William Blatt, Detroit, Mich.

Application March 4, 1935, Serial No. 9,166

9 Claims. (Cl. 188—72)

The present invention relates to brakes and braking systems, particularly but not exclusively intended for use with motor vehicles. It is an object of the present invention to provide a brake and braking system which is positive in operation, rugged in construction, durable in use and in which the effective braking area is materially increased over conventional constructions.

A further object of the invention is to provide a brake and braking system which is capable of ready adjustment and in which a soft braking action is exerted on all of the wheels, the brakes themselves being self-energizing in their action and in which all of the braking surface is contacted every time the brake is applied, thus insuring long life of the brake lining.

Another object of the invention is to provide a brake and braking system in which an air cooled brake or disk of brake lining material is utilized to exert the braking effect and is of such a construction that one or more of the brake disks may be utilized to provide the desired amount of braking area and in which the wear on the brake lining is uniform and beneficial to the brake lining as wear gives a hardened wear-resisting surface to the lining without substantial impairment of frictional engagement between the brake lining and the braking disks.

It is a further object of the invention to provide a brake and braking system in which all braking surfaces are entirely enclosed and thus protected against impairment due to water, dirt, dust and the like entering into the brake drum.

A further object of the invention is to provide a brake and braking system which is lighter in weight than conventional types of braking systems and in which side thrusts on the axles or bearings due to application of the brakes is substantially eliminated.

The invention, while being applicable for use as a clutch or similar structure in various applications, is shown in the drawings and will be described by way of example as applied in a preferred embodiment to the braking system of a motor vehicle.

Other objects of this invention will appear in the following description and appended claims, reference being had to the accompanying drawings forming a part of this specification wherein like reference characters designate corresponding parts in the several views.

Fig. 1 is a side elevation in cross section showing a single disk brake in the applied position.

Fig. 2 is a section taken substantially on the line 2—2 of Fig. 1 in the direction of the arrows.

Fig. 3 is a view similar to Fig. 1 but showing the brake in unapplied position.

Fig. 4 is a section taken substantially on the line 4—4 of Fig. 3 in the direction of the arrows.

Figs. 5 and 6 are diagrammatic views showing the positions of the brake actuating wedges and rollers in the applied and unapplied positions respectively.

Fig. 7 is a plan view with the parts broken away showing a modified form of brake utilizing a plurality of brake disks.

Fig. 8 is a sectional view taken substantially on the line 8—8 of Fig. 7 in the direction of the arrows.

Fig. 9 is a plan view of a modified form of brake disk adapted for use in the present invention.

Fig. 10 is a plan view of the outside face of the brake carrying hub.

Fig. 11 is a staggered sectional view taken substantially on the line 11—11 of Fig. 10 in the direction of the arrows.

Fig. 12 is a plan view of the brake actuating disk.

Fig. 13 is a fragmentary enlarged view of the curved hub showing the spline and centering members.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings I have shown two general types of brake construction embodying the present invention. The first is a single disk type of brake and is shown in Figs. 1 and 3. The second is a multiple disk type and is shown in Figs. 7 and 8. The novel brake actuating mechanism and other features of construction are common to both forms shown.

Referring to Fig. 1, 20 designates a stationary two-piece brake drum which is secured to the axle housing 21 by means of bolts or similar means 22. The drum 20 is provided with a continuous groove 23 in which is mounted a plurality of rolls 24 adapted for rolling contact with wedge members 25 carried on the movable brake actuating plate 26. The wedge members 25 extend into the groove 23 and are thereby maintained at all times in a predetermined position in the assembled brake mechanism. The arrangement of the rollers 24 and the wedge members 25 is shown diagrammatically in Fig. 5 wherein they are shown in their relative positions when the brake is being applied and in Fig. 6 wherein they are shown in their relative positions when the brakes are not being applied. The wedges 25 are moved relative to the rollers 24 by a rotary motion of the movable plate 26 which is effected by cams 27 moving in cam slots 28 provided in the circumferential edge portion of the plate 26. As the plate 26 is moved in accordance with the movement of the cams 27, the wedges 25 ride on the rollers 24 and cause the plate 26 to be pushed inwardly toward the axle housing 21. This causes a face of the plate 26 to contact with an adjacent face of the brake disk or plate 29 which in the embodiment here shown comprises a rigid backing plate 30 on which is secured a plurality of segments 31 formed of any preferred conventional type of friction brake lining materials. Return springs 25a have one end secured to the wedge members 25 and the other end secured in the groove 23 and act as return springs to insure release of the braking pressures by returning the plate 26 to its normal position when the brake actuating mechanism is released. The segments of brake lining 31 are spaced apart on the brake disk 29 and provide a turbine-like effect upon rotation of the disk. The rotation of the disk 29 thus causes air to be drawn inwardly of the housing 20 through a plurality of ventilating air ducts 32, the arrows indicating in each view the approximate direction in which the air travels through the ducts 32 to the interior of the brake structure. Both faces of the brake disk 29 are provided with surfaces of the brake lining materials as above described, one surface contacting with an adjoining face of the brake drum 20 and the other surface contacting with a face of the movable disk 26. The disk 29 rotates with the axle 34 and is carried on a splined hub 35 (Fig. 11) secured to the said axle. As shown in Fig. 11, the splines on the hub are curved as at 36 to permit the disk 29 to move relatively thereto and to find its own center upon the rotation thereof.

The brake operating cams 27 are moved in the cam slots 28 in the movable plate 26 by suitable brake operating levers and linkages of any conventional type which are shown diagrammatically as at 37. This brake operating linkage can be of any preferred commercial type known to those skilled in the art.

In Figs. 1 and 2 the foregoing parts are shown when the brake is in the applied position. It will be here noted that the movable plate 26 has been rotated by the cams 27 which have moved in the cam slots 28 and caused circumferential motion of the plate 26, causing the wedges 25 to contact with the rollers 24 which are carried in the stationary drum 20. This motion causes the plate 26 to be moved inwardly toward the axle housing 21 and to contact the brake lining on the adjacent face of the rotating brake disk or plate 29. The rotation of the disk or plate 29 is thus retarded and as the frictional engagement with the brake disk 29 begins, the motion of the disk 29 is transmitted to the plate 26 and the wedges 25 move further on the rollers 24, which results in a still stronger actuation of the brake, until ultimately the motion of the plate 26 and of the axle 34 is stopped or retarded.

In the released position the several foregoing described parts occupy the position shown in Figs. 3 and 4, where it will be noticed that the release of the brake actuating mechanism frees the brake disk 29 for rotation without contacting with either the face of the movable disk 26 or a face of the stationary brake drum 20. When in this released condition it will be observed that the movable disk 26 occupies a position in which there is no wedging action exerted by the wedges 25 due to contact with the rollers 24. In these views it will be seen that the rigid plate 30 forming part of the brake disk 29 is provided with a rigid splined hub 40 which engages the splined hub 35 carried on the axle 34. The driving of the braking plate or disk 29 and the retardation of the motion of the axle 34 is transmitted from the disk to the axle through this splined hub construction. Any preferred type of wheel studs 41 are carried by the hub 35 and permit attachment of a wheel (not shown) for rotation with the axle 34.

Figs. 10, 11, and 13 show particular details of construction of the hub 35 and particularly show the curved spline construction. If desired, spring-pressed button members 43 and 44 may be provided in the curved section 36 of the splines. With this construction there will be a yielding pressure exerted by the projecting button members 43 and 44 on the adjacent surfaces of the hub on the brake disk or plate 26 which assists in maintaining the disk or plate 26 in a predetermined position relative thereto.

In Fig. 12 is shown the details of the brake actuating plate 26, together with the wedge members 25 and the actuating cam slots 28.

If desired, the brake plate or disk 29 may take the form shown in Fig. 9, in which construction continuous strips 45 of brake lining material are secured as by rivets or the like to the rigid brake supporting plate 30 and thus provide a continuous band of braking material instead of the separate segments thereof as previously discussed in detail in connection with the description of Fig. 4.

A modified form of brake mechanism, designed for use with a plurality of disks of braking material, is shown in Figs. 7 and 8. As there shown, I provide a stationary brake drum 50 which is anchored to the axle housing (not shown) in a manner similar to that previously described in connection with the brake drum 20. A splined hub 51 is secured to the axle 52 and is provided with curved splined surfaces similar to those previously described except that the hub is longer so as to carry the plurality of brake disks provided in this embodiment. The brake disks 53 and 54 are similar in construction to the brake disk heretofore described in detail. They are carried on the curved surfaces of the splined hub 50 and rotate therewith. Spring-pressed buttons 55 similar to those heretofore described, are provided in the hub and act to hold the brake disks 53 and 54 in alignment. A movable brake operating disk 56 is disposed between the disks 53 and 54 and a brake operating disk 57 is disposed outside of and adjacent to the disk 53. Pins 60 extend through the drum 50 and are bolted to the plate 57. A slip connection is provided between the pin 60 and the plate 56. Rollers 61 are provided on the opposite end of the pin 60 and are movable relative to wedge-shaped cam members 62 carried on the stationary brake drum 50. The pin 60 has a slip connection with yoke members 63 which are caused to pivot about shafts 64. The shafts 64 are rotated by levers 65 and 66 which are connected by a connecting rod 67. The brake operating linkage 68 is connected with an end of the lever 66 and causes the motion from the brake actuating mechanism 68 to be transmitted to both the operating lever 66 and the operating lever 65. A spring 69 is connected with the lever 66 and causes the release of the braking mechanism upon release of the brake operating linkage. Upon operation of the brake operating linkage the yokes 63 cause a circumferential movement of the pins 60 which causes the roller 61 to ride up on the inclined cam surfaces 62. This causes a wedging action to be exerted on the roller 61 and transmitted through the pin 60 to the brake operating plate 57. This causes a frictional engagement with the top brake disk and this in turn is transmitted through the intermediate plate 56 to the brake disk 54.

A wheel-carrying hub 70 is secured to the hub 51 by countersunk screws 71 and carries wheel studs 72 which engage with a portion 73 of the wheel.

While I have shown the use of separate brake carrying hub and wheel carrying hub, it is within the purview of my invention to form both hub members as a single hub unit.

In accordance with the foregoing disclosure I can construct a braking surface varying from 125 square inches on a small passenger vehicle, to as high as 1000 square inches on a heavy vehicle without providing an unduly heavy or cumbersome braking system. It also is to be understood that the number of disks may be varied either in the embodiment shown in Figs. 7 and 8 or in the embodiment shown in Figs. 1 and 2, and any desired number of disks may be used instead of the disks as herein disclosed.

The actual operation of the brake operating linkages may be effected in any desired conventional manner; for example, by hydraulic brake operating cylinders, air operated brake operating mechanisms, the ordinary mechanical linkages, or the like.

I claim:

1. A brake comprising a fixed housing having air inlet ports therein, a movable brake operating plate, a splined hub secured to an axle for rotation therewith, a brake disk having spaced segments of brake material secured thereto, said disk being mounted on said hub and rotatable therewith and acting as a turbine to draw air inwardly of said air inlet ports, thereby to cool the interior of said brake, brake actuating members connected with said brake operating plate and adapted to effect movement thereof to apply and release braking pressures exerted by said plate on said disk.

2. A brake comprising a fixed housing, a movable brake operating plate, a splined hub secured to an axle for rotation therewith, a brake disk having spaced segments of brake material secured thereto, and brake actuating members connected with said brake operating plate and comprising inclined wedge members secured to the plate and having contact with roller members mounted in said housing, said wedge and roller members being adapted to effect movement of said plate upon partial rotation thereof to apply and release braking pressures exerted by said plate on said disc.

3. A brake comprising a fixed housing, a movable brake operating plate, a splined hub secured to an axle for rotation therewith and having a plurality of spring-pressed disk centering studs having a portion extending above the surface of said splined hub and adapted to yieldingly contact with a surface of the hub of the brake disk, a frictional disk of brake material carried on said hub and rotatable therewith, and brake actuating members connecting with said brake operating plate and adapted to effect movement thereof to apply and release braking pressures exerted by said plate on said disk.

4. A brake comprising a fixed housing having air inlet ports therein, a movable brake operating plate, a splined hub secured to an axle for rotation therewith, a plurality of brake disks having spaced segments of brake material secured thereto, said disks being mounted on said hub and rotatable therewith and acting as turbines to draw air inwardly of said air inlet ports, thereby to cool the interior of said brake, brake actuating members connected with said brake operating plate and adapted to effect movement thereof to apply and release braking pressures exerted by said plate on said disk.

5. A brake comprising a fixed housing, a movable brake operating plate, a splined hub secured to an axle for rotation therewith and having a plurality of spring-pressed disk-centering studs having a portion extending above the surface of said splined hub and adapted to yieldingly contact with a surface of the hub of the brake disk, a plurality of disk-carrying surfaces of braking material, and brake actuating members connected with said brake operating plate and adapted to effect movement thereof to apply and release braking pressures exerted by said plate on said disk.

6. A brake comprising a fixed housing, a movable brake operating plate, a splined hub secured to an axle for rotation therewith, said splines having arcuate surfaces to permit tilting movement of a hub connected therewith, a frictional disk of brake materials carried on said splined hub and adapted for rotary movement therewith and a sliding movement thereon, a frictional disk of brake material carried on said hub and rotatable therewith, brake actuating members connected with said brake operating plate and adapted to effect movement thereof to apply and release braking pressures exerted by said plate on said disk.

7. A brake comprising a fixed housing, a movable brake operating plate, a splined hub secured to an axle for rotation therewith, said splines having arcuate surfaces to permit tilting movement of a hub connected therewith, a frictional disk of brake materials carried on said splined hub and adapted for rotary movement therewith and a sliding movement thereon, a plurality of disk-carrying surfaces of braking material, and brake actuating members connecting with said brake operating plate and adapted to effect movement thereof to apply and release braking pressures exerted by said plate on said disk.

8. A brake comprising a stationary housing having air inlet ports therein, a brake disk mounted for rotation with an axle and adapted to draw air through said ports inwardly of said housing, a disk clamping member adapted for frictional engagement with the said braking disk for exerting a braking pressure thereon, said disk clamping member having brake actuating means controlled by circumferential movement of said disk clamping member.

9. A brake comprising a stationary housing having air inlet ports therein, a brake disk mounted for rotation with an axle and adapted to draw air through said ports inwardly of said housing, a disk clamping member adapted for frictional engagement with the said braking disk for exerting a braking pressure thereon, said disk clamping member having a plurality of inclined wedge members adapted to contact with roller members carried by said housing and to move toward said brake disk upon circumferential movement of said disk clamping member.

WILLIAM BLATT.